Dec. 24, 1940.  V. GLEASMAN  2,226,309
CLUTCH MEANS FOR TRANSMISSION MEANS
Filed March 11, 1940  2 Sheets-Sheet 1
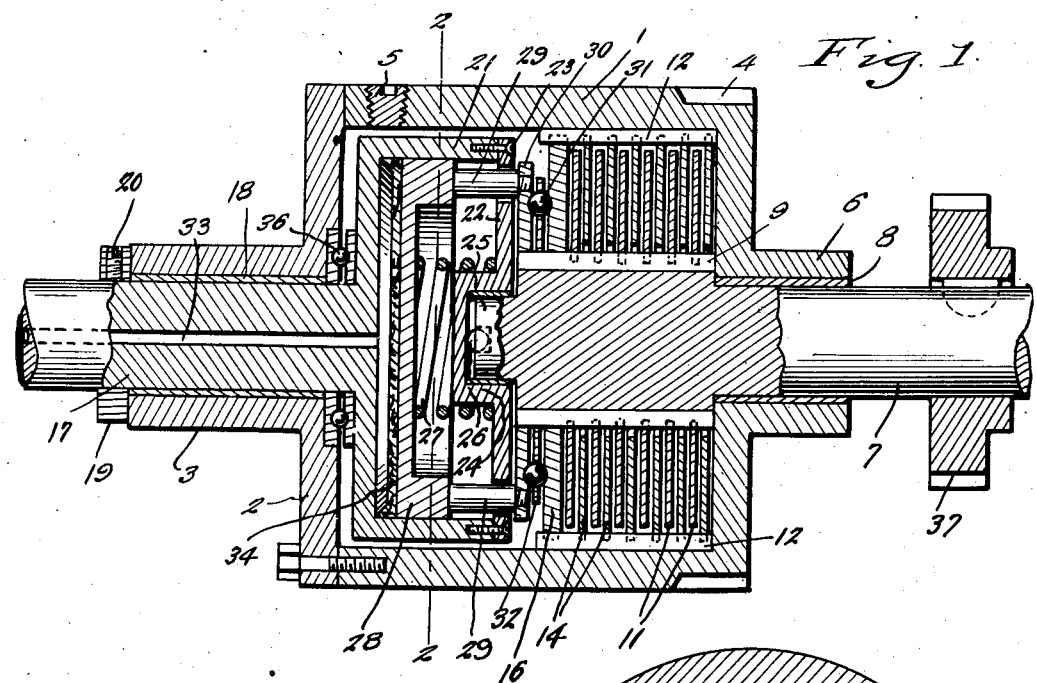
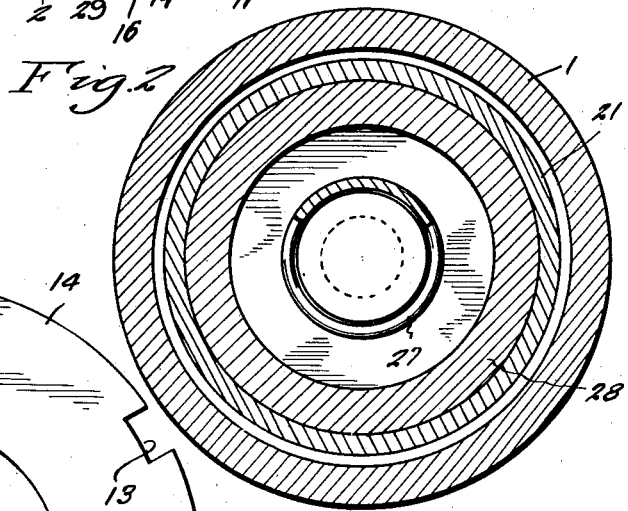
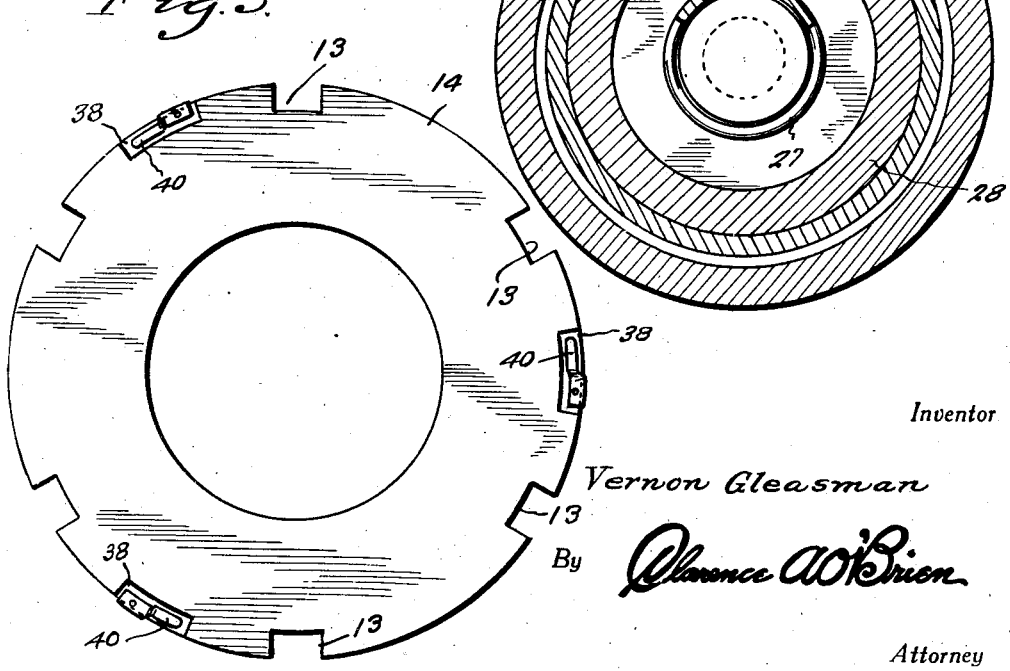
Inventor
Vernon Gleasman
By Clarence A. O'Brien
Attorney Dec. 24, 1940.                V. GLEASMAN                  2,226,309
                CLUTCH MEANS FOR TRANSMISSION MEANS
                    Filed March 11, 1940         2 Sheets-Sheet 2
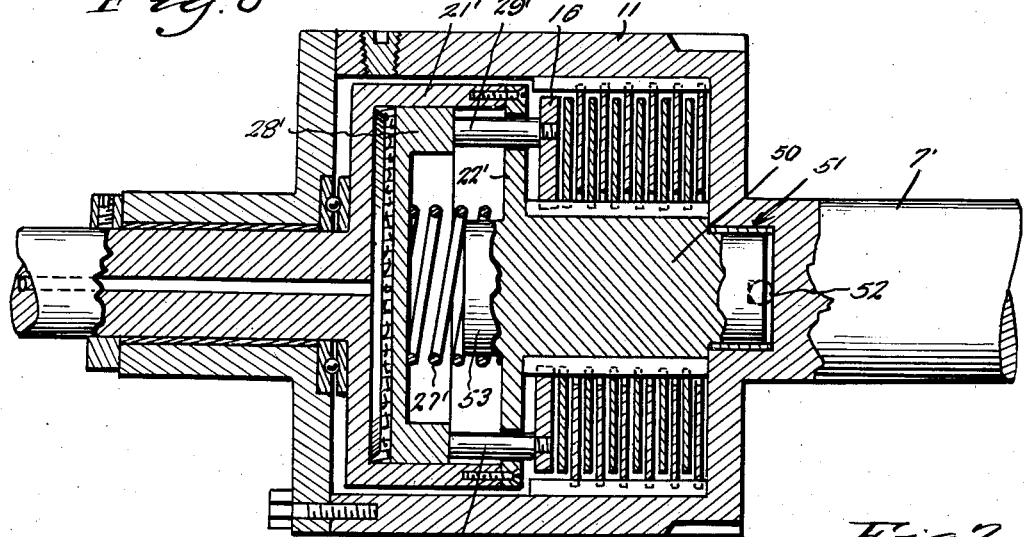
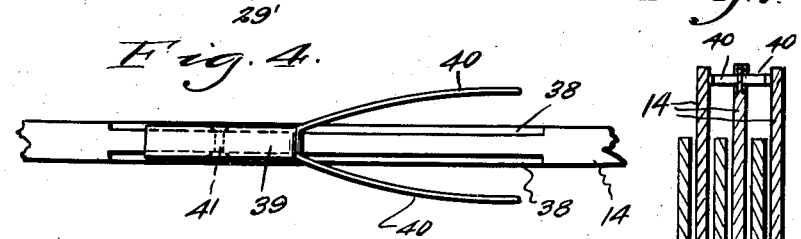
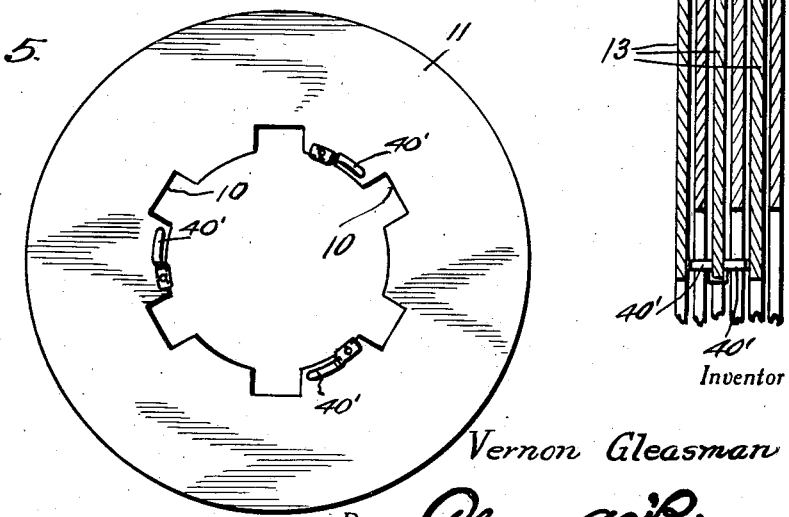
Inventor
Vernon Gleasman
By Clarence A. O'Brien
Attorney Patented Dec. 24, 1940

2,226,309

UNITED STATES PATENT OFFICE 2,226,309

CLUTCH MEANS FOR TRANSMISSION MEANS

Vernon Gleasman, Boonville, N. Y.

Application March 11, 1940, Serial No. 323,432

4 Claims. (Cl. 192—85)

This invention relates to clutch means for gear reduction such as in transmissions, the general object of the invention being to provide two sets of clutch disks between the members to be connected together with fluid actuated means for causing the two sets of disks to frictionally engage each other to connect the parts together, the present invention being an improvement over that forming the subject matter of application Serial No. 199,255, filed by me on March 31, 1938, said application being a division of the application which issued into Letters Patent No. 2,177,213, dated October 24, 1939.

Another object of the invention is to provide spring means for pressing the disks apart when they are released and also to provide spring means for moving the fluid actuated means to inoperative position after the pressure has been removed from the fluid.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a longitudinal sectional view showing one form of the invention.

Figure 2 is a section on the line 2—2 of Figure 1.

Figure 3 is a view of one of the outer disks.

Figure 4 is a fragmentary edge view of a disk showing the spring means attached thereto.

Figure 5 is a view of one of the inner disks.

Figure 6 is a view similar to Figure 1 but showing a modification.

Figure 7 is a sectional view through the disks.

In these drawings the numeral 1 indicates a housing one end of which is open and this end is adapted to be closed by a cover plate 2 having a centrally arranged tubular part 3 thereon. One end of the housing is formed with the gear teeth 4 for engagement by a gear member and the housing or casing 1 is formed with a hole for receiving lubricant, the hole being closed by a plug 5. The closed end of the housing or casing is also formed with a tubular part 6 and a shaft part 7 passes through the tubular part 6 and a sleeve 8 is located between the part 6 and the shaft 7. Within the casing or housing the shaft 7 has an enlarged part which is formed with the longitudinally extending ribs 9 for fitting in the notches 10 of the inner clutch disks 11, one of which is shown in Figure 5. Thus these disks 11 are slidably but non-rotatably carried by the shaft 17. Ribs 12 are formed on the internal walls of the housing or casing 1 and these ribs fit in the notches 13 formed in the outer circumferences of the outer disks 14, one of which is shown in Figure 3 so that these disks 14 are slidably but non-rotatably carried by the inner wall of the housing or casing 1. A follower ring 16 surrounds the inner end of the shaft 7 and is located adjacent the outermost ring or disk 11 and this ring 16 has notches therein for receiving the ribs 12 of the casing.

A shaft 17 passes through the tubular part 3 into the casing and through a sleeve 18 arranged in the tubular part 3, a collar 19 being held to the shaft by a set screw 20, the collar abutting the outer end of the part 3. A large cylinder 21 is connected to the inner end of the shaft 17 and is located within the housing 1 and a cover plate 22 is fastened to the inner end of the cylinder by the screws 23. The cover plate has an inwardly extending centrally arranged boss 24 for receiving the reduced end 25 at the inner end of the shaft 7, a centrally arranged ball 26 being located between said end of the shaft and the center of the boss 24. A coiled spring 27 surrounds the boss and bears against the central part of a substantially cupshaped piston 28 in the cylindrical part 21. This piston 28 carries the plungers 29 which pass through holes in the cover plate 22 and have connected with their outer ends the race ring 30 of the ball bearings 31 which bear against the follower plate 16, said balls being carried by the ring plate 32. The shaft 17 is formed with a bore 33 which opens into the cylinder 21 in rear of the piston 28, said piston being provided with a cup washer 34 on its top face which faces the bottom of the cylinder.

From the foregoing it will be seen that when fluid such as oil is introduced under pressure through the bore 33 into the cylinder 21 it will force the piston 28 to the right in Figure 1, thus causing the plungers 29 to force the anti-friction means against the follower and cause the follower to compress the clutch disks against each other and thus connect the casing or housing 1 with the shaft 7. When the fluid pressure is released the spring 27 will push the piston 28 rearwardly thus relieving pressure on the anti-friction means 31 so that the disks will separate and thus the shaft 7 is released from the housing 1.

Anti-friction means 36 are provided between the cover plate 2 and the cylinder 21 and a pinion or gear 37 may be connected with the shaft 7 to mesh with another gear.

Every other one of the disks 14 has portions of its outer circumference between the notches 13 reduced by having the grooves 38 therein, one on each side thereof and the channel-shaped shank 39 of a pair of spring fingers 40 is attached to each reduced part by a rivet 41 or the like (see Figures 3 and 4). Similar spring means shown generally at 40' are placed on portions of the inner circumference of every other one of the disks 11 as shown in Figure 5. These springs will act to separate the disks when the follower is free of pressure.

This invention can be used in transmission means for automobiles and the like and wherever it is desired to provide clutch means for connecting one member to another member. As will be seen from Figure 1 the oil actuated means stands still at all times while the other parts are rotating so that any possible chance of the parts failing to act under centrifugal force is eliminated and the clutch plate and associated parts are lubricated by the lubricant placed in the housing 1 through the opening closed by the plug 5. This invention can be used for a high gear clutch such as disclosed in the patent before-mentioned. The spring means on the plates or disks holds the plates equi-distant apart when the clutch is released so that there is no dragging of the plates or disks and there is practically no wear on the springs because they travel with the disks.

In Figure 6 the housing 1' is formed with a shaft part 7' and the cover plate 22' for the cylinder 21' is formed with a shaft part 50 which has one end journaled in a recess 51 in the closed end of the housing 1' with an anti-friction means 52 for said end and the spring 27' which holds the piston 28' in released position encircles a cylindrical part 53 on the cover plate. Also, the anti-friction means between the follower plate 16' and the plunger 29' are eliminated and, of course, the inner disks are carried by the part 50. In other respects this form of the invention is similar to that before described and this form of the invention is useful for line shafts.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A device of the class described comprising a housing, clutch plates slidably but non-rotatably arranged in the housing, a member located in the housing, clutch plates slidably but non-rotatably carried by the member and located between the first-mentioned clutch plates, a follower plate, a shaft passing into the housing through one end thereof and said shaft having an enlarged integral cylindrical portion at its inner end located in the housing, a piston in the cylindrical portion and said shaft having a bore passing therethrough for the introduction of fluid under pressure into the cylindrical portion, a cover plate for the cylindrical portion having holes therein, plungers carried by the piston and passing through the holes for applying pressure to the follower plate when the piston is moved by the fluid pressure and a spring having one end bearing against the piston and its other end against a part of the cover plate for normally holding the piston retracted.

2. A device of the class described comprising a housing, clutch plates slidably but non-rotatably carried by the housing, a member in the housing, clutch plates slidably but non-rotatably carried by the member and passing between the first-mentioned clutch plates, a follower for pressing the clutch plates into frictional engagement, a shaft passing into the housing, a cylinder at the inner end of the shaft located in the housing, said shaft having a bore for the introduction of fluid pressure therethrough into the cylinder, a piston in the cylinder acted upon by said fluid pressure, plungers carried by the piston, anti-friction means between the plungers and the follower and spring means for holding the piston in retracted position.

3. In a clutch device of the class described including two sets of clutch plates and spring means for normally holding the plates separated, each spring means including a channel-shaped shank and spring prongs extending from one end of the flanges of the shank, the spring carrying plate having a recess in each face thereof of a peripheral portion of the plate, the channel-shaped shank having its flanges located in said recesses with its bight extending over the peripheral portion of the plate and a fastener passing through the flanges and the plate.

4. A device of the class described comprising a housing, clutch plates slidably but non-rotatably carried in the housing, a member located in the housing, clutch plates slidably but non-rotatably carried by the member and located between the first-mentioned clutch plates, a follower plate, a shaft passing into the housing through one end thereof and said shaft having an enlarged integral cylindrical portion at its inner end located in the housing, said shaft having a bore passing therethrough for the introduction of fluid under pressure into the cylindrical portion, a piston in the cylindrical portion, a cover plate for the cylindrical portion having holes therein, plungers carried by the piston and passing through the holes for applying pressure to the follower plate when the piston is moved by the fluid pressure and a spring having one end bearing against the piston and its other end against a part of the cover plate for normally holding the piston retracted, said cover plate having a centrally arranged enlargement on that face which faces the piston for fitting in one end of the spring.

VERNON GLEASMAN.